US012247719B2

(12) United States Patent
Liu

(10) Patent No.: US 12,247,719 B2
(45) Date of Patent: Mar. 11, 2025

(54) SOLAR MAGNETIC SUCTION LINEAR LAMP

(71) Applicant: Huamin Liu, Xi'an (CN)

(72) Inventor: Huamin Liu, Xi'an (CN)

( * ) Notice: Subject to any disclaimer, the term of this patent is extended or adjusted under 35 U.S.C. 154(b) by 3 days.

(21) Appl. No.: 18/667,885

(22) Filed: May 17, 2024

(65) Prior Publication Data

US 2024/0302010 A1 Sep. 12, 2024

(51) Int. Cl.

| | |
|---|---|
| ***F21S 9/03*** | (2006.01) |
| ***F21V 21/096*** | (2006.01) |
| ***F21V 21/30*** | (2006.01) |
| ***F21V 31/03*** | (2006.01) |
| *F21W 131/10* | (2006.01) |
| *F21Y 103/10* | (2016.01) |
| *F21Y 115/10* | (2016.01) |

(52) U.S. Cl.
CPC ............ *F21S 9/037* (2013.01); *F21V 21/096* (2013.01); *F21V 21/30* (2013.01); *F21V 31/03* (2013.01); *F21W 2131/10* (2013.01); *F21Y 2103/10* (2016.08); *F21Y 2115/10* (2016.08)

(58) Field of Classification Search
CPC ... F21V 17/105; F21V 21/0965; F21V 21/096
See application file for complete search history.

(56) References Cited

U.S. PATENT DOCUMENTS

| | | | | |
|---|---|---|---|---|
| 7,367,689 | B2 * | 5/2008 | Huang | F21L 14/026 362/399 |
| 11,333,309 | B1 * | 5/2022 | Martini | F21S 4/10 |
| 11,473,743 | B1 * | 10/2022 | Lin | F21V 17/12 |
| 2009/0135597 | A1 | 5/2009 | Kay | |
| 2012/0236552 | A1 | 9/2012 | Leineweber et al. | |
| 2015/0267902 | A1 * | 9/2015 | Zhang | F21V 21/30 362/188 |
| 2022/0120392 | A1 | 4/2022 | Wang et al. | |
| 2023/0383915 | A1 * | 11/2023 | Jeong | F21V 17/06 |

* cited by examiner

*Primary Examiner* — Robert J May
(74) *Attorney, Agent, or Firm* — Hemisphere Law, PLLC; Zhigang Ma

(57) ABSTRACT

The present disclosure relates to the technical field of use of flexible light-emitting filaments in outdoor solar lamps, and in particular to, a solar magnetic suction linear lamp, including a locating structure, wherein the locating structure includes a lamp frame; a transparent lampshade is arranged in an inner cavity of the lamp frame; and a lighting structure is arranged in the inner cavity of the lamp frame. After a light bar is turned on, a lamp base is plugged into the lamp frame; a steel locating head extends into the transparent lampshade; the steel locating head is sucked through a strong magnet and is located through the magnetism of the strong magnet; the light bar is pulled through the steel locating head; a mounting plate and the lamp base are located through the light bar.

5 Claims, 5 Drawing Sheets

SOLAR MAGNETIC SUCTION LINEAR LAMP

TECHNICAL FIELD

The present disclosure relates to the technical field of use of flexible light-emitting filaments in outdoor solar lamps, and specifically to, a solar magnetic suction linear lamp.

BACKGROUND

A linear lamp is a lighting fixture made of a light-emitting diode (LED) linear lamp strip.

After searching, the utility mode No. CN218494908U, entitled magnetic lamp, includes a shell. It is found through research and analysis that this magnetic lamp does not need to be mounted on a lamp fitting like a traditional bulb lamp, but the magnetic lamp has the following disadvantages to an extent.

For example, during use, the device is mounted locally, needs to be charged via a socket and mounted via a lamp holder, and is not waterproof and inconvenient for use outdoors. Furthermore, the device has poor energy saving and environment protection effects and relatively fixed lighting locations, so that the device is inconvenient to use. To solve the above technical problems, a solar magnetic suction linear lamp has been designed.

SUMMARY

The present disclosure aims to provide a solar magnetic suction linear lamp, which features convenience in mounting and use and solves the following problems: During use, the device is mounted locally, needs to be charged via a socket and mounted via a lamp holder, and is not waterproof and inconvenient for use outdoors; and the device has relatively fixed lighting locations, so that the device is inconvenient to use.

To achieve the above objectives, the present disclosure provides the following technical solution: A solar magnetic suction linear lamp includes a locating structure, wherein the locating structure includes a lamp frame; a transparent lampshade is arranged in an inner cavity of the lamp frame; and a lighting structure is arranged in the inner cavity of the lamp frame.

Preferably, an inner wall of the lamp frame is adhered with a mounting seat; and a strong magnet is adhered at a top of an inner cavity of the mounting seat.

Preferably, the lighting structure includes a lamp base; a bottom of the lamp base is plugged into the lamp frame; a solar battery panel is embedded into a top of the lamp base; the bottom of the lamp base is connected with a mounting plate by a bolt; a bottom of the mounting plate is connected with a battery holder by a bolt; a storage battery is clamped into the battery holder; the bottom of the mounting plate is connected with a control switch by a bolt; a light bar is mounted at the bottom of the mounting plate; and a bottom of the light bar is adhered with a steel locating head.

Preferably, a mounting hole is formed in the top of the lamp base; the storage battery is electrically connected to the solar battery panel; and the control switch is electrically connected to the storage battery and the light bar respectively.

Preferably, a through hole is formed in a bottom of the transparent lampshade; and a drainage hole is formed in the bottom of the transparent lampshade.

Preferably, the transparent lampshade is in an integrated cylindrical design.

Compared with the prior art, the present disclosure has the beneficial effects below:

After the light bar is turned on, the lamp base is plugged into the lamp frame; the steel locating head extends into the transparent lampshade; the steel locating head is sucked through the strong magnet and is located through the magnetism of the strong magnet; the light bar is pulled through the steel locating head; the mounting plate and the lamp base are located through the light bar; in the daytime, the solar battery panel can receive the sunlight, so that the light bar can be turned off; when the sunlight irradiates the top of the solar battery panel, the solar battery panel converts solar energy into electric energy; and the electric energy is stored in the storage battery to supply power to the device later.

Figure 1:
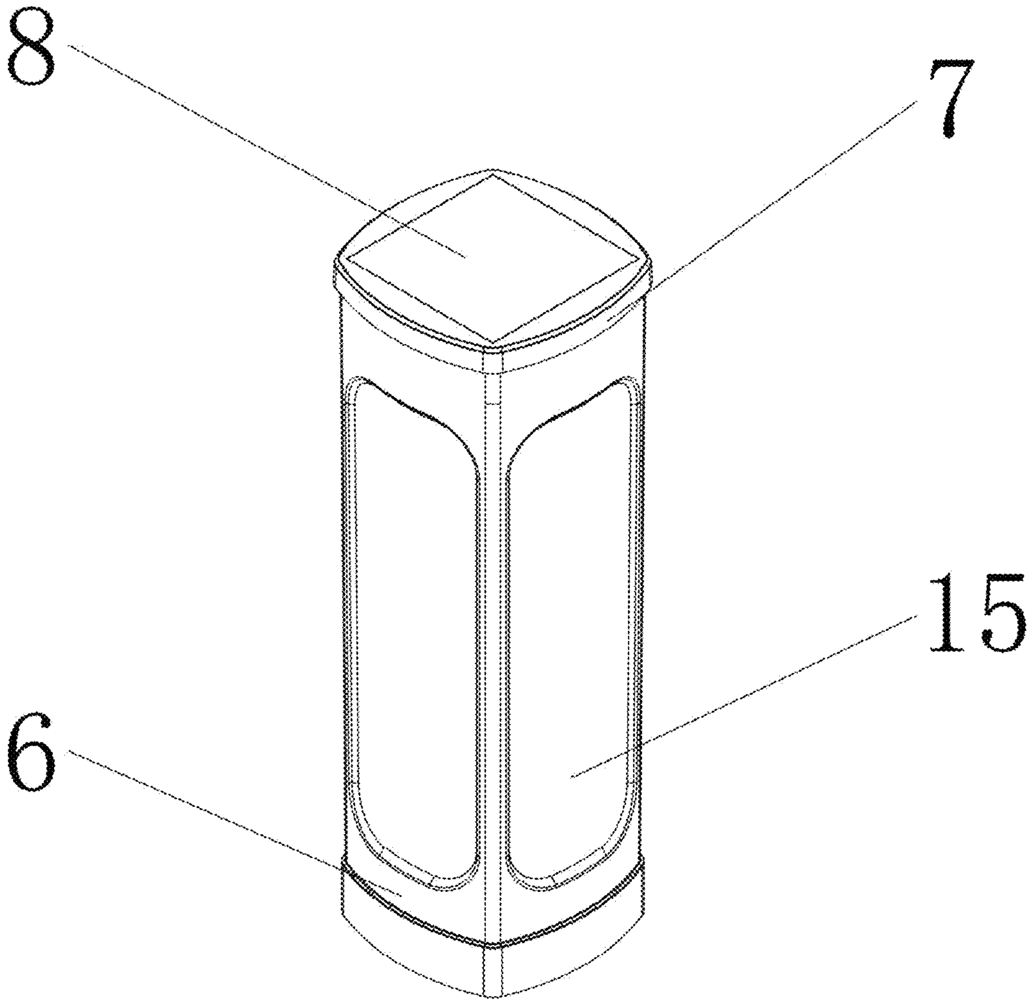
FIG. 1 is a structural axonometric drawing of the present disclosure.

In the drawings, 1: locating structure; 2: lighting structure; 3: drainage hole; 4: mounting seat; 5: strong magnet; 6: lamp frame; 7: lamp base; 8: solar battery panel; 9: mounting plate; 10: control switch; 11: battery holder; 12: storage battery; 13: light bar; 14: steel locating head; and 15: transparent lampshade.

DETAILED DESCRIPTION OF THE EMBODIMENTS

Referring to FIG. 1 to FIG. 4, a solar magnetic suction linear lamp includes a locating structure 1, wherein the locating structure 1 includes a lamp frame 6; a transparent lampshade 15 is arranged in an inner cavity of the lamp frame 6; and a lighting structure 2 is arranged in the inner cavity of the lamp frame 6.

Figure 4:
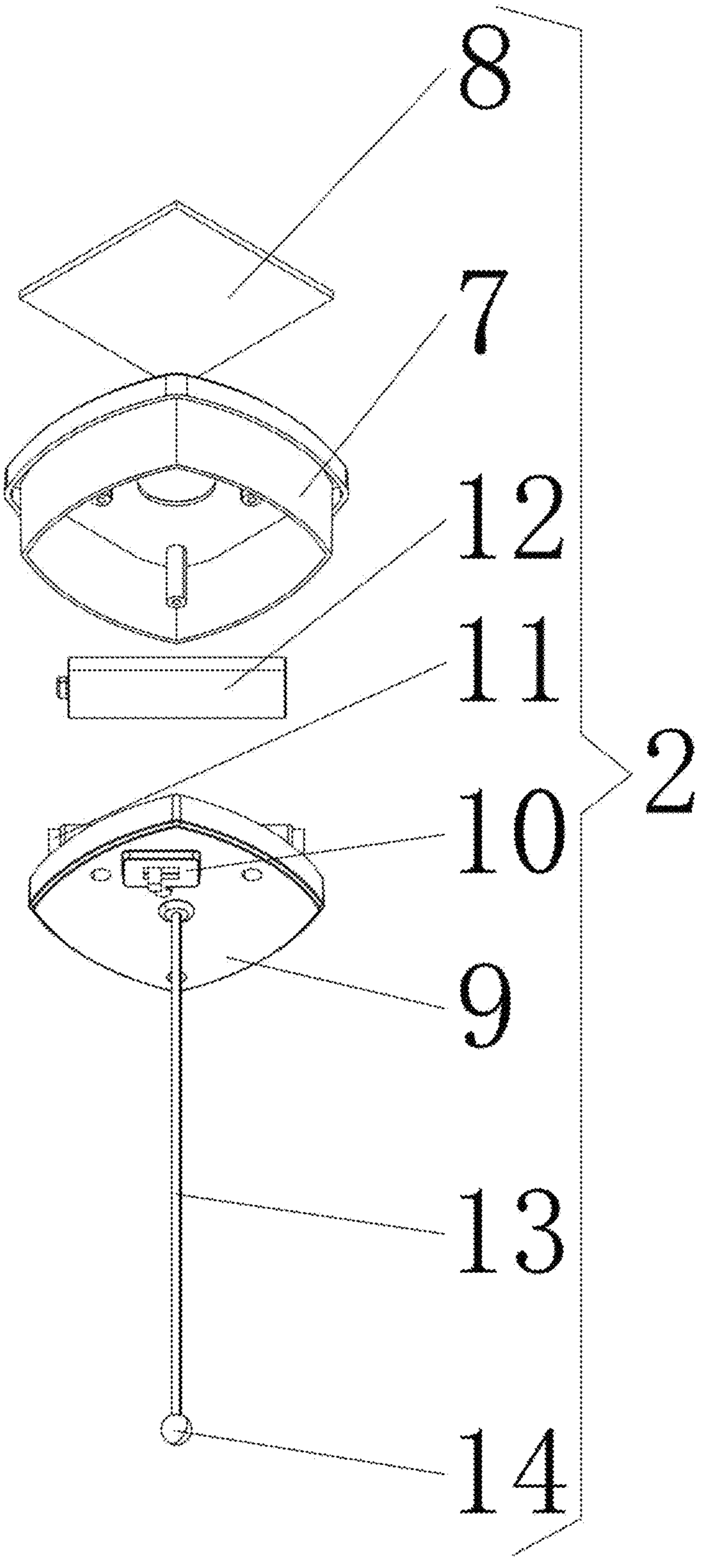
FIG. 4 is a three-dimensional diagram of a lamp bade and a steel locating head the present disclosure.

Referring to FIG. 1 and FIG. 4, an inner wall of the lamp frame 6 is adhered with a mounting seat 4; and a strong magnet 5 is adhered at a top of an inner cavity of the mounting seat 4. By the arrangement of the mounting seat 4, it can be convenient for mounting the lamp frame 6 and maintaining the stability of the lamp frame 6.

Figure 3:
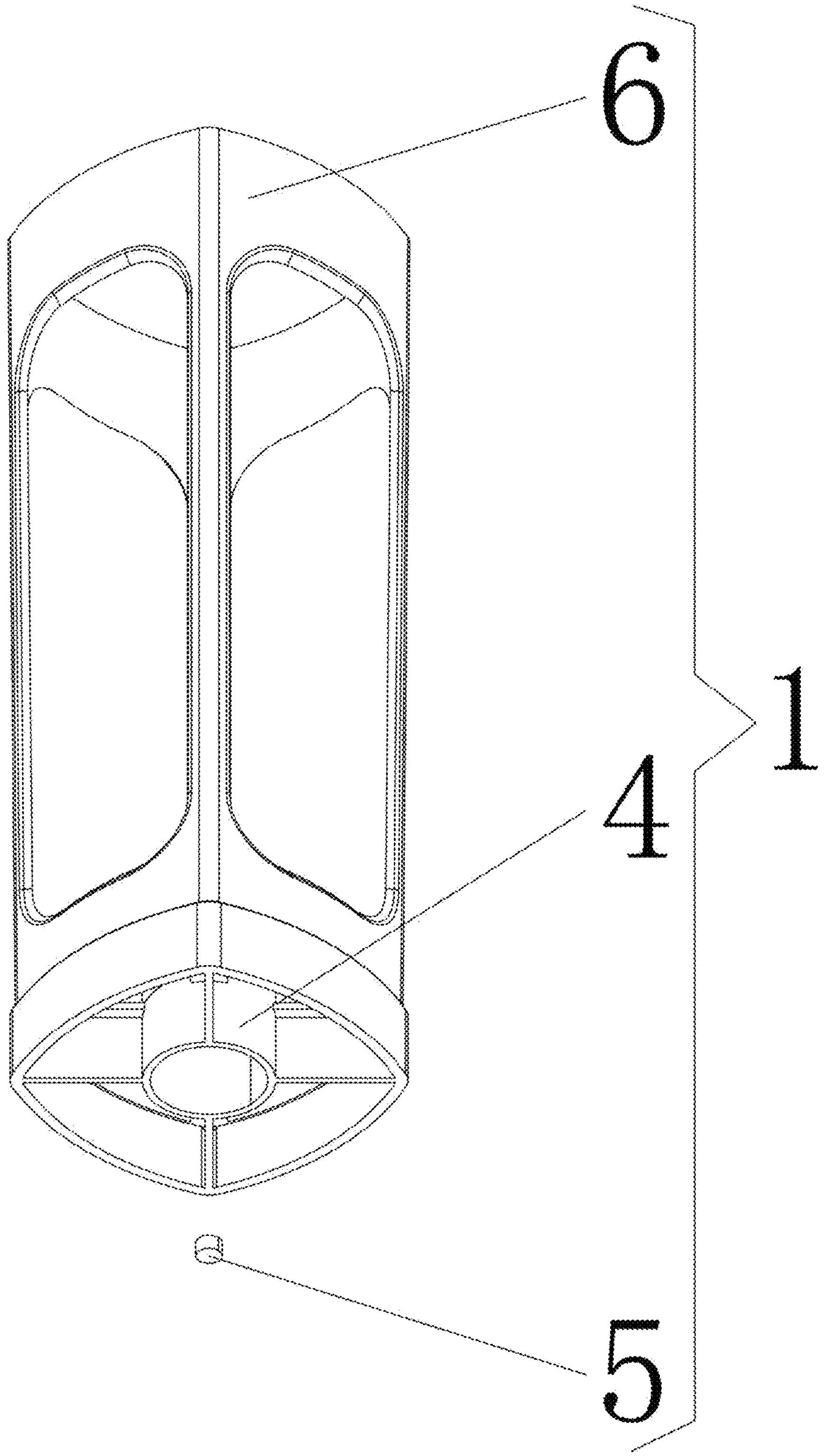
FIG. 3 is a three-dimensional diagram of a mounting seat and a lamp frame according to the present disclosure.

Referring to FIG. 1 and FIG. 3, the lighting structure 2 includes a lamp base 7; a bottom of the lamp base 7 is plugged into the lamp frame 6; a solar battery panel 8 is embedded into a top of the lamp base 7; the bottom of the lamp base 7 is connected with a mounting plate 9 by a bolt; a bottom of the mounting plate 9 is connected with a battery holder 11 by a bolt; a storage battery 12 is clamped into the battery holder 11; the bottom of the mounting plate 9 is connected with a control switch 10 by a bolt; a light bar 13 is mounted at the bottom of the mounting plate 9; and a bottom of the light bar 13 is adhered with a steel locating head 14. By the arrangement of the solar battery panel 8, it can be convenient for converting solar energy into electric energy, and energy saving and environment protection effects can be achieved.

Referring to FIG. 3, a mounting hole is formed in the top of the lamp base 7; the storage battery 12 is electrically connected to the solar battery panel 8; and the control switch 10 is electrically connected to the storage battery 12 and the light bar 13 respectively. By the arrangement of the mounting hole, it is convenient for a connecting wire for connecting the solar battery panel 8 to the battery holder 11 to pass through, so that the electric energy can be conveniently conveyed to the storage battery 12.

Figure 2:
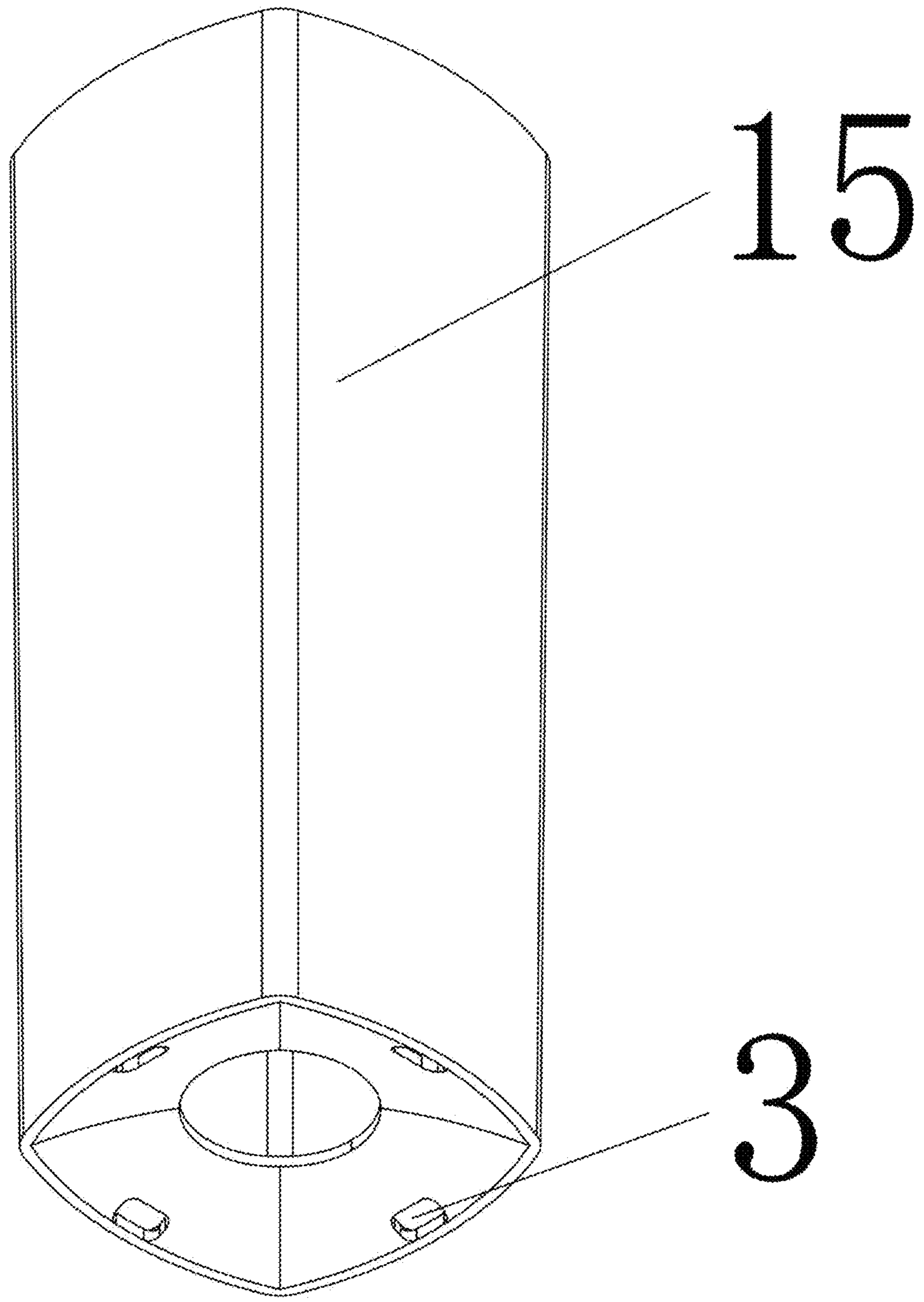
FIG. 2 is a three-dimensional diagram of a transparent lampshade and a drainage hole according to the present disclosure.

Referring to FIG. 2, a through hole is formed in a bottom of the transparent lampshade 15; and drainage holes 3 are formed in the bottom of the transparent lampshade 15. By the arrangement of the through hole, it is convenient for the steel locating head 14 to pass through; and it is convenient for the strong magnet 5 to suck the steel locating head 14. By the arrangement of the drainage holes 3, a drainage effect can be achieved, and it is convenient to drain water in the transparent lampshade 15.

Embodiment I

Figure 5:
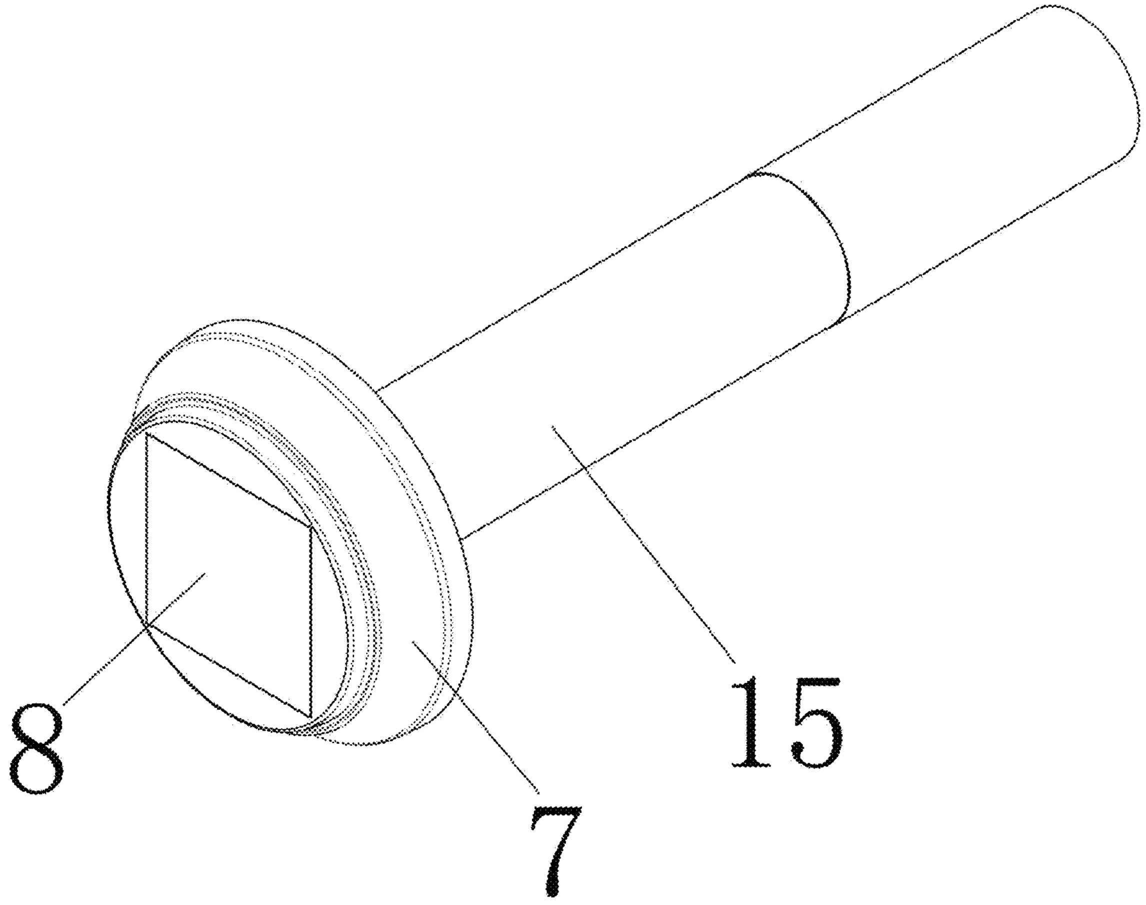
FIG. 5 is a three-dimensional diagram of Embodiment I of the present disclosure.

Referring to FIG. 5, the transparent lampshade 15 is in an integrated cylindrical design. The transparent lampshade 15 is of an integrated structure, so that blocking of the lamp frame 6 is avoided, and the lighting effect can be enhanced.

During use, after the light bar 13 is turned on, the lamp base 7 is plugged into the lamp frame 6; the steel locating head 14 extends into the transparent lampshade 15. The steel locating head 14 is sucked through the strong magnet 5 and is located through the magnetism of the strong magnet 5; the light bar 13 is pulled through the steel locating head 14; the mounting plate 9 and the lamp base 7 are located through the light bar 13; in the daytime, the solar battery panel 8 can receive the sunlight, so that the light bar 13 can be turned off; when the sunlight irradiates the top of the solar battery panel 8, the solar battery panel 8 converts solar energy into electric energy; and the electric energy is stored in the storage battery 12 to supply power to the device later.

In summary, according to the solar magnetic suction linear lamp, through the storage battery 12, the light bar 13, the steel locating head 14, the transparent lampshade 15, the drainage holes 3, the locating structure 1, and the lighting structure 2, the following problems are solved: During use, the device is mounted locally, needs to be charged via a socket and mounted via a lamp holder, and is not waterproof and inconvenient for use outdoors; and the device has relatively fixed lighting locations, so that the device is inconvenient to use.

What is claimed is:

1. A solar magnetic suction linear lamp, comprising a locating structure (1), wherein the locating structure (1) comprises a lamp frame (6); a transparent lampshade (15) is arranged in an inner cavity of the lamp frame (6); and a lighting structure (2) is arranged in the inner cavity of the lamp frame (6);

wherein the lighting structure (2) comprises a lamp base (7); a bottom of the lamp base (7) is plugged into the lamp frame (6); a solar battery panel (8) is embedded into a top of the lamp base (7); the bottom of the lamp base (7) is connected with a mounting plate (9) by a bolt; a bottom of the mounting plate (9) is connected with a battery holder (11) by a bolt; a storage battery (12) is clamped into the battery holder (11); the bottom of the mounting plate (9) is connected with a control switch (10) by a bolt; a light bar (13) is mounted at the bottom of the mounting plate (9); and a bottom of the light bar (13) is adhered with a steel locating head (14).

2. The solar magnetic suction linear lamp according to claim 1, wherein an inner wall of the lamp frame (6) is adhered with a mounting seat (4); and a strong magnet (5) is adhered at a top of an inner cavity of the mounting seat (4).

3. The solar magnetic suction linear lamp according to claim 1, wherein a mounting hole is formed in the top of the lamp base (7); the storage battery (12) is electrically connected to the solar battery panel (8); and the control switch (10) is electrically connected to the storage battery (12) and the light bar (13) respectively.

4. The solar magnetic suction linear lamp according to claim 1, wherein a through hole is formed in a bottom of the transparent lampshade (15); and a drainage hole (3) is formed in the bottom of the transparent lampshade (15).

5. The solar magnetic suction linear lamp according to claim 4, wherein the transparent lampshade (15) is in an integrated cylindrical design.

* * * * *